United States Patent
Houghton

(10) Patent No.: US 8,533,223 B2
(45) Date of Patent: Sep. 10, 2013

(54) DISAMBIGUATION AND TAGGING OF ENTITIES

(75) Inventor: David F. Houghton, Brattleboro, VT (US)

(73) Assignee: Comcast Interactive Media, LLC., Philadelphia, PA (US)

(*) Notice: Subject to any disclaimer, the term of this patent is extended or adjusted under 35 U.S.C. 154(b) by 286 days.

(21) Appl. No.: 12/464,392

(22) Filed: May 12, 2009

(65) Prior Publication Data

US 2010/0293195 A1 Nov. 18, 2010

(51) Int. Cl.
*G06F 17/30* (2006.01)

(52) U.S. Cl.
USPC ............ 707/776; 707/759; 707/765; 707/913

(58) Field of Classification Search
USPC ............... 707/705, 706, 708, 723, 726, 730, 707/735, 738, 739, 740, 741, 748, 749, 750, 707/912, 913, 914, 916, 943, 759, 765, 776
See application file for complete search history.

(56) References Cited

U.S. PATENT DOCUMENTS

| | | | |
|---|---|---|---|
| 4,227,177 A | 10/1980 | Moshier | |
| 5,493,677 A | 2/1996 | Balogh et al. | |
| 5,521,841 A | 5/1996 | Arman et al. | |
| 5,530,859 A | 6/1996 | Tobias, II et al. | |
| 5,535,063 A | 7/1996 | Lamming | |
| 5,553,281 A | 9/1996 | Brown et al. | |
| 5,576,755 A | 11/1996 | Davis et al. | |
| 5,594,897 A | 1/1997 | Goffman | |
| 5,640,553 A | 6/1997 | Schultz | |
| 5,649,182 A | 7/1997 | Reitz | |
| 5,682,326 A | 10/1997 | Klingler et al. | |
| 5,717,914 A | 2/1998 | Husick et al. | |
| 5,729,741 A | 3/1998 | Liaguno et al. | |
| 5,737,495 A | 4/1998 | Adams et al. | |
| 5,737,734 A | 4/1998 | Schultz | |
| 5,742,816 A | 4/1998 | Barr et al. | |

(Continued)

FOREIGN PATENT DOCUMENTS

| | | |
|---|---|---|
| CA | 2685833 A1 | 5/2010 |
| EP | 1241587 A1 | 9/2002 |

(Continued)

OTHER PUBLICATIONS

Smith, J.R. et al. "An Image and Video Search Engine for the World-Wide Web" Storage and Retrieval for Image and Video Databases 5, San Jose, Feb. 13-14, 1997, Proceedings of Spie, Belingham, Spie, US, vol. 3022, Feb. 13, 1997, pp. 84-95.

(Continued)

*Primary Examiner* — John E Breene
*Assistant Examiner* — Evan Aspinwall
(74) *Attorney, Agent, or Firm* — Banner & Witcoff, Ltd.

(57) ABSTRACT

Tagging of content items and entities identified therein may include a matching process, a classification process and a disambiguation process. Matching may include the identification of potential matching candidate entities in a content item whereas the classification process may categorize or group identified candidate entities according to known entities to which they are likely a match. In some instances, a candidate entity may be categorized with multiple known entities. Accordingly, a disambiguation process may be used to reduce the potential matches to a single known entity. In one example, the disambiguation process may include ranking potentially matching known entities according to a hierarchy of criteria.

21 Claims, 10 Drawing Sheets

(56) References Cited

U.S. PATENT DOCUMENTS

| | | |
|---|---|---|
| 5,761,655 A | 6/1998 | Hoffman |
| 5,765,150 A | 6/1998 | Burrows |
| 5,799,315 A | 8/1998 | Rainey et al. |
| 5,845,279 A | 12/1998 | Garofalakis et al. |
| 5,857,200 A | 1/1999 | Togawa |
| 5,924,090 A | 7/1999 | Krellenstein |
| 5,928,330 A | 7/1999 | Goetz et al. |
| 5,956,729 A | 9/1999 | Goetz et al. |
| 5,982,369 A | 11/1999 | Sciammarella et al. |
| 6,038,560 A | 3/2000 | Wical |
| 6,052,657 A | 4/2000 | Yamron et al. |
| 6,055,543 A | 4/2000 | Christensen et al. |
| 6,058,392 A | 5/2000 | Sampson et al. |
| 6,188,976 B1 | 2/2001 | Ramaswamy et al. |
| 6,320,588 B1 | 11/2001 | Palmer et al. |
| 6,345,253 B1 | 2/2002 | Viswanathan |
| 6,363,380 B1 | 3/2002 | Dimitrova |
| 6,366,296 B1 | 4/2002 | Boreczky et al. |
| 6,374,260 B1 | 4/2002 | Hoffert et al. |
| 6,415,434 B1 | 7/2002 | Kind |
| 6,418,431 B1 | 7/2002 | Mahajan et al. |
| 6,463,444 B1 | 10/2002 | Jain et al. |
| 6,545,209 B1* | 4/2003 | Flannery et al. ............ 84/609 |
| 6,567,980 B1 | 5/2003 | Jain et al. |
| 6,675,174 B1 | 1/2004 | Bolle et al. |
| 6,698,020 B1 | 2/2004 | Zigmond et al. |
| 6,792,426 B2 | 9/2004 | Baumeister et al. |
| 6,877,134 B1 | 4/2005 | Fuller et al. |
| 6,882,793 B1 | 4/2005 | Fu et al. |
| 6,901,364 B2 | 5/2005 | Nguyen et al. |
| 6,937,766 B1 | 8/2005 | Wilf et al. |
| 6,970,639 B1 | 11/2005 | McGrath et al. |
| 7,177,861 B2 | 2/2007 | Tovinkere et al. |
| 7,206,303 B2 | 4/2007 | Karas et al. |
| 7,272,558 B1 | 9/2007 | Soucy et al. |
| 7,376,642 B2 | 5/2008 | Nayak et al. |
| 7,472,137 B2 | 12/2008 | Edelstein et al. |
| 7,490,092 B2 | 2/2009 | Sibley et al. |
| 7,548,934 B1 | 6/2009 | Platt et al. |
| 7,584,102 B2 | 9/2009 | Hwang et al. |
| 7,739,286 B2 | 6/2010 | Sethy et al. |
| 7,788,266 B2* | 8/2010 | Venkataraman et al. ..... 707/748 |
| 7,921,116 B2 | 4/2011 | Finkelstein et al. |
| 7,925,506 B2 | 4/2011 | Farmaner et al. |
| 7,958,119 B2* | 6/2011 | Eggink et al. ............. 707/732 |
| 8,041,566 B2 | 10/2011 | Peters et al. |
| 8,078,467 B2 | 12/2011 | Wu et al. |
| 8,117,206 B2 | 2/2012 | Sibley et al. |
| 8,265,933 B2 | 9/2012 | Bates et al. |
| 2001/0014891 A1 | 8/2001 | Hoffert et al. |
| 2002/0035573 A1 | 3/2002 | Black et al. |
| 2002/0143774 A1 | 10/2002 | Vandersluis |
| 2002/0194181 A1 | 12/2002 | Wachtel |
| 2003/0014758 A1 | 1/2003 | Kim |
| 2003/0050778 A1 | 3/2003 | Nguyen et al. |
| 2003/0061028 A1 | 3/2003 | Dey et al. |
| 2003/0093790 A1 | 5/2003 | Logan et al. |
| 2003/0135582 A1 | 7/2003 | Allen et al. |
| 2003/0163443 A1 | 8/2003 | Wang |
| 2003/0163815 A1 | 8/2003 | Begeja et al. |
| 2003/0195877 A1 | 10/2003 | Ford et al. |
| 2004/0111465 A1 | 6/2004 | Chuang et al. |
| 2004/0117831 A1 | 6/2004 | Ellis et al. |
| 2004/0215634 A1 | 10/2004 | Wakefield et al. |
| 2004/0254795 A1 | 12/2004 | Fujii et al. |
| 2005/0044105 A1 | 2/2005 | Terrell |
| 2005/0060647 A1 | 3/2005 | Doan et al. |
| 2005/0097138 A1* | 5/2005 | Kaiser et al. ............. 707/104.1 |
| 2005/0114130 A1 | 5/2005 | Java et al. |
| 2005/0152362 A1 | 7/2005 | Wu |
| 2005/0193005 A1 | 9/2005 | Gates et al. |
| 2005/0222975 A1 | 10/2005 | Nayak et al. |
| 2006/0037046 A1 | 2/2006 | Simms et al. |
| 2006/0074671 A1 | 4/2006 | Farmaner et al. |
| 2006/0100898 A1 | 5/2006 | Pearce et al. |
| 2006/0112097 A1 | 5/2006 | Callaghan et al. |
| 2006/0156399 A1 | 7/2006 | Parmar et al. |
| 2006/0161546 A1 | 7/2006 | Callaghan et al. |
| 2006/0167859 A1 | 7/2006 | Verbeck Sibley et al. |
| 2006/0212288 A1 | 9/2006 | Sethy et al. |
| 2006/0235843 A1* | 10/2006 | Musgrove et al. ............... 707/6 |
| 2006/0253780 A1 | 11/2006 | Munetsugu et al. |
| 2006/0256739 A1 | 11/2006 | Seier et al. |
| 2007/0050343 A1 | 3/2007 | Siddarammappa et al. |
| 2007/0050366 A1 | 3/2007 | Bugir et al. |
| 2007/0067285 A1 | 3/2007 | Blume et al. |
| 2007/0083374 A1 | 4/2007 | Bates et al. |
| 2007/0156677 A1 | 7/2007 | Szabo |
| 2007/0208567 A1 | 9/2007 | Amento et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0233487 A1 | 10/2007 | Cohen et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0271086 A1 | 11/2007 | Peters et al. |
| 2008/0046929 A1 | 2/2008 | Cho et al. |
| 2008/0091633 A1 | 4/2008 | Rappaport et al. |
| 2008/0133504 A1 | 6/2008 | Messer et al. |
| 2008/0163328 A1 | 7/2008 | Philbin et al. |
| 2008/0183681 A1 | 7/2008 | Messer et al. |
| 2008/0183698 A1 | 7/2008 | Messer et al. |
| 2008/0189110 A1 | 8/2008 | Freeman et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0208864 A1 | 8/2008 | Cucerzan et al. |
| 2008/0221989 A1 | 9/2008 | Messer et al. |
| 2008/0222105 A1* | 9/2008 | Matheny ....................... 707/3 |
| 2008/0222106 A1 | 9/2008 | Rao et al. |
| 2008/0222142 A1* | 9/2008 | O'Donnell ....................... 707/5 |
| 2008/0235209 A1 | 9/2008 | Rathod et al. |
| 2008/0235393 A1 | 9/2008 | Kunjithapatham et al. |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0281801 A1 | 11/2008 | Larson et al. |
| 2008/0288641 A1 | 11/2008 | Messer et al. |
| 2009/0006315 A1 | 1/2009 | Mukherjea et al. |
| 2009/0006391 A1* | 1/2009 | Ram ............................... 707/6 |
| 2009/0013002 A1* | 1/2009 | Eggink et al. ............ 707/104.1 |
| 2009/0025054 A1 | 1/2009 | Gibbs et al. |
| 2009/0083257 A1 | 3/2009 | Bargeron et al. |
| 2009/0094113 A1 | 4/2009 | Berry et al. |
| 2009/0123021 A1 | 5/2009 | Jung et al. |
| 2009/0144260 A1 | 6/2009 | Bennett et al. |
| 2009/0198686 A1* | 8/2009 | Cushman et al. ................. 707/5 |
| 2009/0204599 A1 | 8/2009 | Morris et al. |
| 2009/0205018 A1 | 8/2009 | Ferraiolo et al. |
| 2009/0240650 A1 | 9/2009 | Wang et al. |
| 2009/0240674 A1 | 9/2009 | Wilde et al. |
| 2009/0271195 A1 | 10/2009 | Kitade et al. |
| 2009/0282069 A1 | 11/2009 | Callaghan et al. |
| 2009/0326947 A1 | 12/2009 | Arnold et al. |
| 2010/0042602 A1 | 2/2010 | Smyros et al. |
| 2010/0070507 A1* | 3/2010 | Mori ............................. 707/741 |
| 2010/0094845 A1* | 4/2010 | Moon et al. .................... 707/705 |
| 2010/0138653 A1 | 6/2010 | Spencer et al. |
| 2010/0250598 A1* | 9/2010 | Brauer et al. ................. 707/780 |
| 2011/0077943 A1 | 3/2011 | Miki et al. |
| 2011/0125728 A1 | 5/2011 | Smyros et al. |
| 2011/0191099 A1 | 8/2011 | Farmaner et al. |
| 2012/0150636 A1 | 6/2012 | Freeman et al. |

FOREIGN PATENT DOCUMENTS

| | | |
|---|---|---|
| EP | 1501305 A1 | 1/2005 |
| GB | 2448874 A | 11/2008 |
| GB | 2448875 A | 11/2008 |
| WO | 9950830 A1 | 10/1999 |
| WO | 0205135 A2 | 1/2002 |
| WO | 2006099621 A2 | 9/2006 |

| | | |
|---|---|---|
| WO | 2007115224 A2 | 10/2007 |
| WO | 2008053132 A1 | 5/2008 |
| WO | 2009052277 A1 | 4/2009 |

OTHER PUBLICATIONS

Messer, Alan et al, "SeeNSearch: A Context Directed Search Facilitator for Home Entertainment Devices", Paper, Samsung Information Systems America Inc., San Jose, CA.
Extended European search report for application No. 10162666.1 mailed Aug. 4, 2011.
Wacholder N et al., "Disambiguation of Proper Names in Text", Proceedings of the Conference on Applied Natural Language Processing, Association Computer Linguistics, Morrisontown, NJ, Mar. 1, 2007.
IPER PCT/US2009/069644—Jun. 29, 2011.
ISR PCT/US2009/069644—Mar. 4, 2010.
ESR—EP10154725.5—Nov. 2, 2010.
ESR—EP10155340.2—Nov. 25, 2010.
Partial ESR—EP10155340.2—Jul. 12, 2010.
ESR—EP10167947.0—Sep. 28, 2010.
ISR PCT/US2001/020894—Nov. 25, 2003.
Ying Zhang and Phil Vines. 2004, "Using the web for automated translation extraction in cross-language information retrieval". In Proceedings of the 27th annual international ACM SIGIR conference on Research and development in information retrieval (SIGIR '04). ACM, New York, NY, USA, 162-169.
Kalina Bontcheva et al "Shallow Methods for Named Entity Coreference Resolution", Proc. of Taln 2002, Jan. 1, 2002.
Raphael Volz et al., "Towards ontologybased disambiguation of geographical identifiers", Proceedings of the WWW2007 Workshop I3: Identity, Identifiers, Identification, Entity-Centric Approaches to Information and Knowledge Management on the Web, Jan. 1, 2007.
Wacholder N. et al., "Disambiguation of Proper Names in Text", Proceedings of the Conference on Applied Natural Language Processing, Association Computer Linguistics, Morrisontown, NJ, Mar. 1, 2007.
Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.
Changsheng Xu et al., "Using Webcast Text for Semantic Event Detection in Broadcast Sports Video", IEEE Transactions on Multimedia, vol. 10, No. 7, pp. 1342-1355, Nov. 2008.
Liang Bai et al., "Video Semantic Content Analysis based on Ontology", International Machine Vision and Image Processing Conference, pp. 117-124, Sep. 2007.
Koskela M. et al., "Measuring Concept Similarities in Multimedia Ontologies: Analysis and Evaluations", IEEE Transactions on Multimedia, vol. 9, No. 5, pp. 912-922, Aug. 2007.
Steffen Staab et al., "Semantic Multimedia", Reasoning Web; Lecture Notes in Computer Science, pp. 125-170, Sep. 2008.
European Search Report EP09179987.4, dated Jun. 4, 2010.
Li, Y. et al., "Reliable Video Clock Time Recognition," Pattern Recognition, 2006, 1CPR 1006, 18th International Conference on Pattern Recognition, 4 pages.
Salton et al., Computer Evaluation of Indexing and Text Processing Journal of the Association for Computing Machinery, vol. 15, No. 1, Jan. 1968, pp. 8-36.
European Search Report for Application No. 09180776.8, mailed Jun. 7, 2010, 9 pages.
European Search Report EP 09180762, dated Mar. 22, 2010.
European Application No. 09175979.5—Office Action mailed Mar. 15, 2010.
EP Application No. 09 175 979.5—Office Action mailed Apr. 11, 2011.
Smith, J.R. et al., "An Image and Video Search Engine for the World-Wide Web" Storage and Retrieval for Image and Video Databases 5, San Jose, Feb. 13-14, 1997, Proceedings of Spie, Belingham, Spie, US, vol. 3022, Feb. 13, 1997, pp. 84-95.
Kontothoanassis, Ledonias et al. "Design, Implementation, and Analysis of a Multimedia Indexing and Delivery Server", Technical Report Series, Aug. 1999, Cambridge Research Laboratory.
European Patent Application No. 09175979.5—Office Action dated Dec. 13, 2011.
International Preliminary Examination Report for PCT/US01/20894, dated Feb. 4, 2002.
"Towards a Multimedia World-Wide Web Information retrieval engines", Sougata Mukherjea, Kyoji Hirata, and Yoshinori Hara Computer Networks and ISDN Systems 29 (1997) 1181-1191.
Eberman, et al., "Indexing Multimedia for the Internet", Compaq, Cambridge Research laboratory, Mar. 1999, pp. 1-8 and Abstract.
Ishitani, et al., "Logical Structure Analysis of Document Images Based on Emergent Computation", IEEE Publication, pp. 189-192, Jul. 1999.
First Office Action in EP01950739.1-1244 dated Mar. 27, 2009.
Chen, "Extraction of Indicative Summary Sentences from Imaged Documents", IEEE publication, 1997, pp. 227-232.
Hsin-Min Wang and Berlin Chen, "Content-based Language Models for Spoken Document Retrieval", ACM, 2000, pp. 149-155.
Marin, Feldman, Ostendort and Gupta, "Filtering Web Text to Match Target Genres", International Conference on Acoustics, Speech and Signal Processing, 2009, Piscataway, NJ, Apr. 19, 2009, pp. 3705-3708.
European Search Report for application No. 10167947.0, mailed Sep. 28, 2010.
Extended European Search Report—EP 09815446.1—mailing date: May 7, 2013.
Shahraray: "Impact and Applications of Video Content Analysis and Coding in the Internet and Telecommunications", AT&T Labs Research, A Position Statement for Panel 4: Applications the 1998 International workshop on Very Low Bitrate Video Coding, 3 pages, date unknown but prior to application filing date.
"Experiments in Spoken Document Retrieval at CMU", M.A. Siegler, M.J. Wittbrock, S.T. Slattery, K. Seymore, R.E. Jones, and A.G. Hauptmann, School of Computer Science Carnegie Mellon University, Pittsburgh, PA 15213-3890, Justsystem Pittsburgh Research Center, 4616 Henry Street, Pittsburgh, PA 15213, date unknown but prior to application filing date.

* cited by examiner

Director [Joe Doe] and [Bridget Jones] team up for a third time in ["Movie 123,"] an adaptation of [Author 1]'s short story. [Bridget] plays a woman who is born in the 1880s, and must cope with the absurd expectations of her father. Oscar winner [Brandon Jones] costars, along with [Joe Shmoe] and [Daisy Flower.]

[M. 123] captures your attention from the beginning especially with the performance of [B. Jones]. Few directors could have tackled the film's daunting visual requirements as brilliantly as [Joe Doe] has. [Bridget J.] and [123] should be nominated for this stunning performance.

FIG. 2

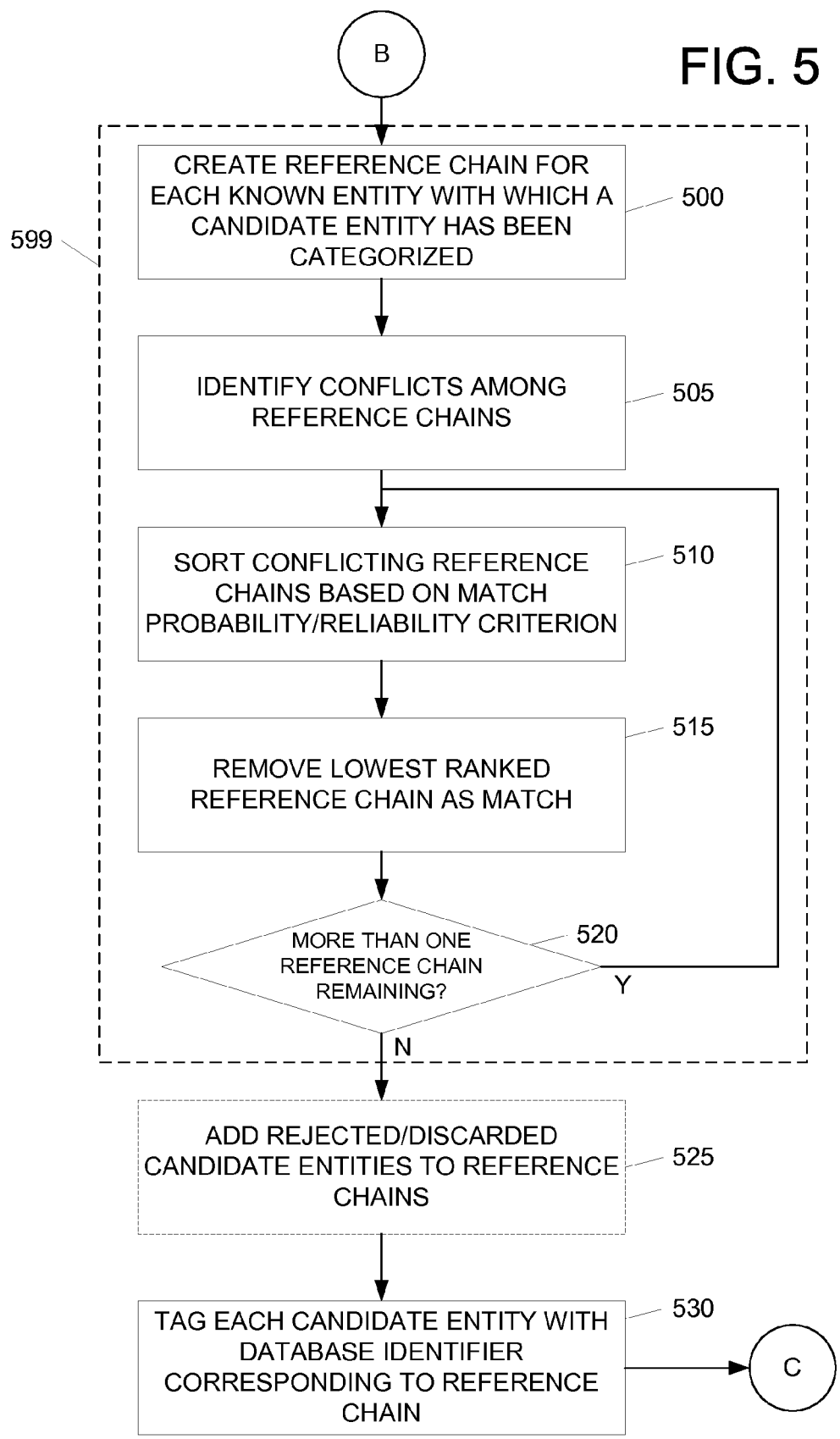

DISAMBIGUATION AND TAGGING OF ENTITIES

TECHNICAL FIELD

Aspects of the invention relate to identifying entities in an information stream. Specifically, aspects are directed to resolving ambiguities in tagging entities in various types of media.

BACKGROUND

With the advent of the Internet and computing technologies in general, information about a wide array of topics has become readily available. The accessibility of such information allows a person to read about a topic and immediately obtain additional information about an entity mentioned in the article, webpage, white paper or other media. The entity may be a person, a movie, a song, a book title and the like. Alternatively, a person may wish to add the article or webpage to a database of information about the entity mentioned. However, the process of confirming that the entity mentioned corresponds to a particular known entity (e.g., a known entity in a database or an entity identified through a search) may be tedious and time consuming. Furthermore, tagging or associating an entity with the wrong person or title may lead to various inefficiencies in a system.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

One or more aspects described herein relate to identifying and tagging entities in a content item. In one example, an article about a scientific breakthrough may name the scientists that were involved in the effort and the institution (e.g., a school) where the research took place. The scientists and the institution may each be tagged as a known entity if those scientists or the institution are known to a database or system. By tagging the scientists or institution, a processing system may link a user to additional information about each of the entities such as other articles, videos and the like. Additionally or alternatively, content items, once tagged, may be organized or sorted based on entities that are referenced therein.

According to another aspect, candidate entities (i.e., entities that have not been confirmed as references to known entities) may be associated with some level of ambiguity in view of the candidate entity's similarity to multiple known entities. In such instances, the ambiguity is resolved before the candidate entity is tagged. Thus, disambiguation may be performed and may include the sorting and ranking of the multiple known entities for which the conflicted candidate entity may be a match according to a hierarchy of criteria. Once sorted, the lowest ranked known entity may be removed from consideration. The process may repeat until a single known entity remains, at which point the candidate entity may be tagged as corresponding to the remaining known entity.

According to yet another aspect, the identification, classification and disambiguation process for candidate entities may be based on prior knowledge that is collected from a variety of sources either automatically or manually or both.

For example, some articles or other content items may be manually tagged to identify people mentioned in those content items. Accordingly, the manual decisions and taggings may serve as a basis for the matching, categorization and disambiguation of candidate entities. Language models and finite state automata (e.g., built by the prior knowledge) may also be used to classify and identify candidate entities in a content item. Finite state automata (FSA) refer generally to process models comprising a number of finite states and transitions between the states and actions. FSAs may be used to identify subsequences of characters in strings, e.g., to find potential names. The language model may then assign probabilities to the identified strings, allowing for the identification of unusual uses of language, and in particular ordinary phrases used as names.

According to one or more configurations, a feature detector may be used to identify attributes of a tagged content item or entity that may help with the matching, classification and disambiguation of other content items or entities. For example, if a person is referred to using an epithet in a tagged content item, the processing system may use or look for the epithet to determine whether a candidate entity in another content item refers to the same person.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 2 illustrates an example content item that may be analyzed and tagged according to one or more aspects described herein.

FIG. 5 illustrates an example method for disambiguating candidate entities according to one or more aspects described herein.

DETAILED DESCRIPTION

Figure 1:
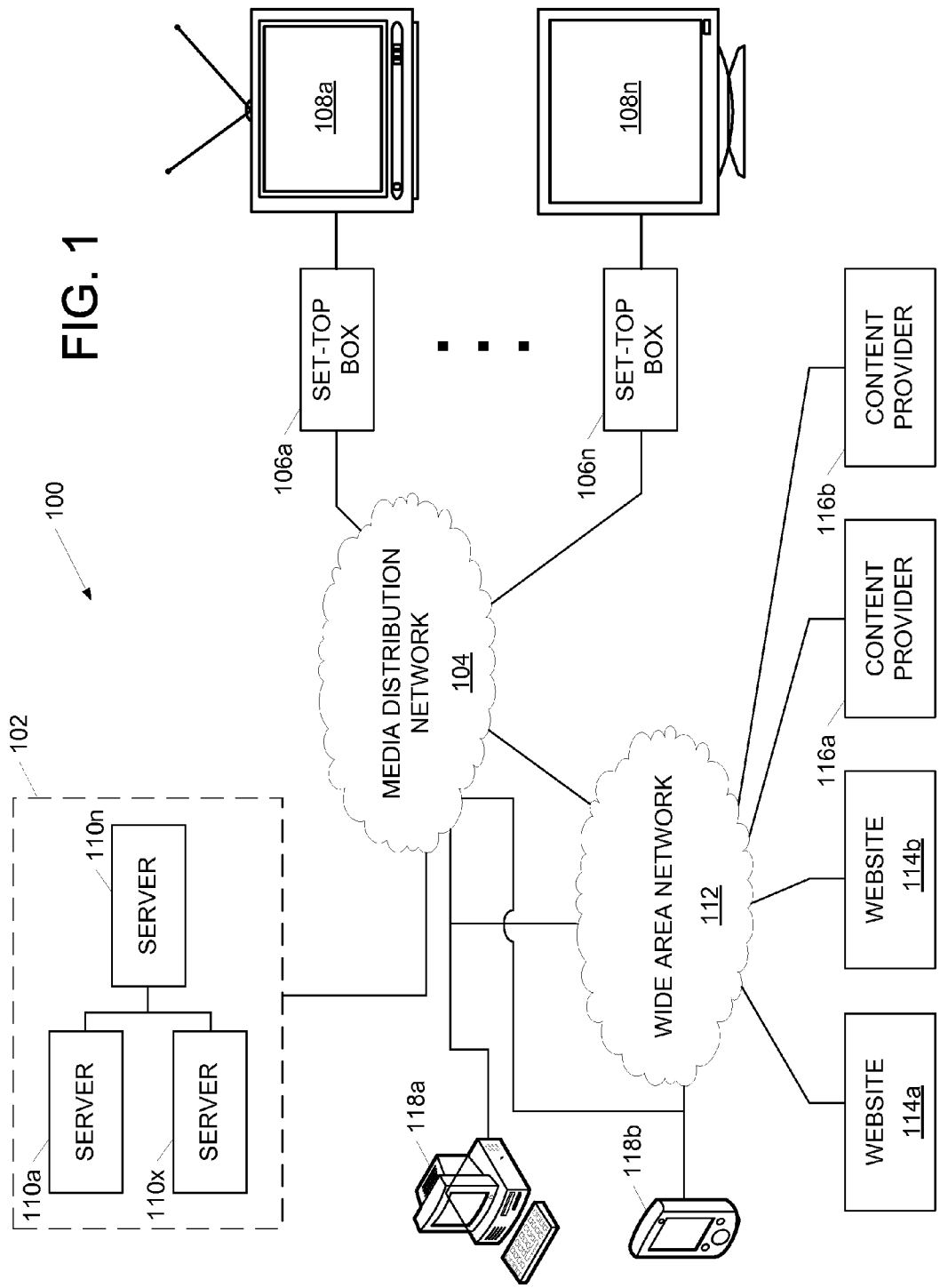
FIG. 1 illustrates an example network distribution system in which content items may be provided to subscribing clients.

FIG. 1 illustrates a content processing and distribution system 100 that may be used in connection with one or more aspects described herein. The distribution system 100 may include a headend 102, a network 104, set top boxes (STB) 106 and corresponding receiving devices (i.e., receiver, transceiver, etc.) 108. The distribution system 100 may be used as a media service provider/subscriber system wherein the provider (or vendor) generally operates the headend 102 and the network 104 and also provides a subscriber (i.e., client, customer, service purchaser, user, etc.) with the STB 106.

The STB 106 is generally located at the subscriber location such as a subscriber's home, a tavern, a hotel room, a business, etc., and the receiving device 108 is generally provided by the subscribing client. The receiving device 108 may include a television, high definition television (HDTV), monitor, host viewing device, MP3 player, audio receiver, radio, communication device, personal computer, media player, digital video recorder, game playing device, etc. The device 108 may be implemented as a transceiver having interactive capability in connection with the STB 106, the headend 102 or both the STB 106 and the headend 102. Alternatively, STB 106 may include a cable modem for computers for access over cable.

The headend 102 is generally electrically coupled to the network 104, the network 104 is generally electrically coupled to the STB 106, and each STB 106 is generally electrically coupled to the respective device 108. The electrical coupling may be implemented as any appropriate hardwired (e.g., twisted pair, untwisted conductors, coaxial cable, fiber optic cable, hybrid fiber cable, etc.) or wireless (e.g., radio frequency, microwave, infrared, etc.) coupling and protocol (e.g., Home Plug, HomePNA, IEEE 802.11(a-b), Bluetooth, HomeRF, etc.) to meet the design criteria of a particular application. While the distribution system 100 is illustrated showing one STB 106 coupled to one respective receiving device 108, each STB 106 may be configured with having the capability of coupling more than one device 108.

The headend 102 may include a plurality of devices 110 (e.g., devices 110a-110n) such as data servers, computers, processors, security encryption and decryption apparatuses or systems, and the like configured to provide video and audio data (e.g., movies, music, television programming, games, and the like), processing equipment (e.g., provider operated subscriber account processing servers), television service transceivers (e.g., transceivers for standard broadcast television and radio, digital television, HDTV, audio, MP3, text messaging, gaming, etc.), and the like. At least one of the devices 110 (e.g., a sender security device 110x), may include a security system.

In one or more embodiments, network 104 may further provide access to a wide area network (WAN) 112 such as the Internet. Accordingly, STB 106 or headend 102 may have access to content and data on the wide area network. Content items may include audio, video, text and/or combinations thereof. In one example, a service provider may allow a subscriber to access websites 114 and content providers 116 connected to the Internet (i.e., WAN 112) using the STB 106. Websites 114 may include news sites, social networking sites, personal webpages and the like. In another example, a service provider (e.g., a media provider) may supplement or customize media data sent to a subscriber's STB 106 using data from the WAN 112. Alternatively or additionally, one or more other computing devices 118 may be used to access either media distribution network 104 or wide area network 112.

Information systems such as headend 102, websites 114 or content providers 116 may include databases that store known entities such as people (e.g., actors, directors), names of content items (e.g., movies, songs, television shows) and the like. Information about these entities may be tracked and stored so that content items relating to the same entity may be linked. Entities, as used herein, refer generally to unique objects to which a content item may make reference. In one example, a user reading an article about a movie may be provided with links to additional information about the movie, actors, directors or other people mentioned in the article, other movies, songs and the like. The database may be consulted to determine if the entities mentioned in the article are known to the system and if so, any additional information relating to the entities may be provided to the user.

FIG. 2 illustrates an example content item that makes reference to multiple known entities. Known entities, as used herein, refer to a unique individual or object (e.g., a movie, book, location, etc.) that is recognized by a processing system. In one or more configurations, known entities may be associated with a database identifier in the system. Content item 200 includes an article 201 having multiple passages 203. Each of these passages 203 may include one or more references 205 to known entities. Accordingly, a content processing system may provide a robust reading interface by identifying and tagging these references 205 as corresponding to known entities. For example, a tagging system may, once entities have been tagged, provide a user with additional information such as articles, videos, biographies and the like about the entities.

Figure 8:
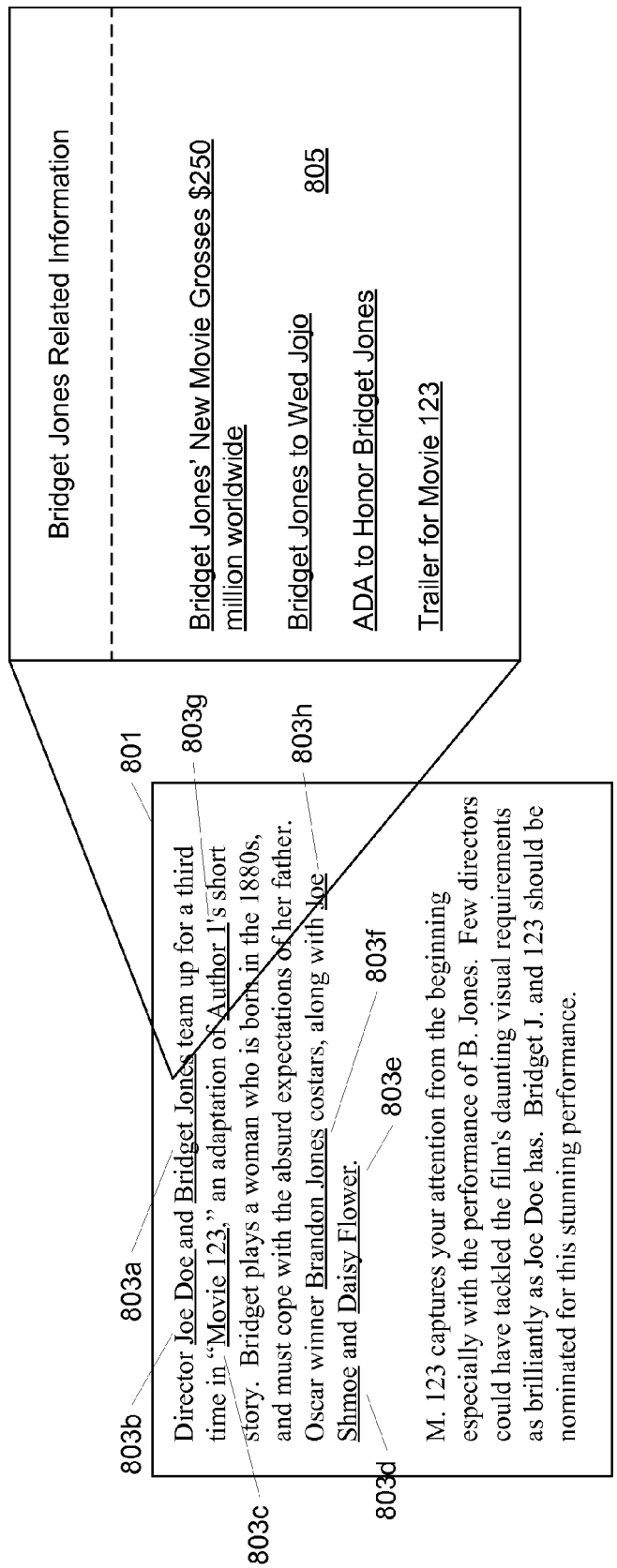
FIG. 8 illustrates a tagged content item and information accessible through the tagged content item according to one or more aspects described herein.

FIG. 8 illustrates an example of a tagged content item 801 in which entities have been tagged and converted into hyperlinks 803. In the illustrated example, only a first reference to an entity may be converted to a hyperlink. By selecting and following hyperlinks 803, a user may be provided with a list 805 of additional information about the entity corresponding to the selected hyperlink. For example, selecting hyperlink 803a may cause list 805 containing additional articles and other content relating to "Bridget Jones" to be displayed. A tagging system may retrieve such articles from a database in which information and content is associated with particular known entities. Accordingly, once a candidate entity has been tagged as corresponding to a particular known entity, the information and content associated with the known entity may be retrieved and provided to the user.

In some instances, however, identifying and tagging entities in a content item may be difficult due to ambiguities. For example, the same name or title may correspond to multiple known entities. Accordingly, such ambiguities may be resolved with a sufficient degree of accuracy to provide a benefit to users. Aspects described herein relate to the identification, disambiguation and tagging of entities in a content item. The process may include various processes including a text or string matching process, a classification process and a disambiguation process. The text matching process generally includes the identification of candidate entities through a comparison of words and phrases in a content item with known entities. In one example, words or phrases may be processed for matches using a set of finite state automata. A candidate entity refers to a reference (e.g., a word or phrase) in a content item that meets a threshold probability of corresponding to a known entity. In one example, a candidate entity may include a set of all substrings that match a particular regular expression corresponding to a known entity. The classification process then takes the candidate entities and categorizes the entities into one or more categories corresponding to types of entities. Types of entities may include celebrities, movie titles, song names, actors, musicians, false positives and the like. By categorizing the entities in such a manner, some level of disambiguation is accomplished. Additionally, false positives may be weeded out of the processing stream. In the disambiguation process, candidate entities that are ambiguous within a category (e.g., two actors with the same name) may be further evaluated to identify the correct or most likely matching known entity. Each of these processes is described in further detail herein.

Figure 3:
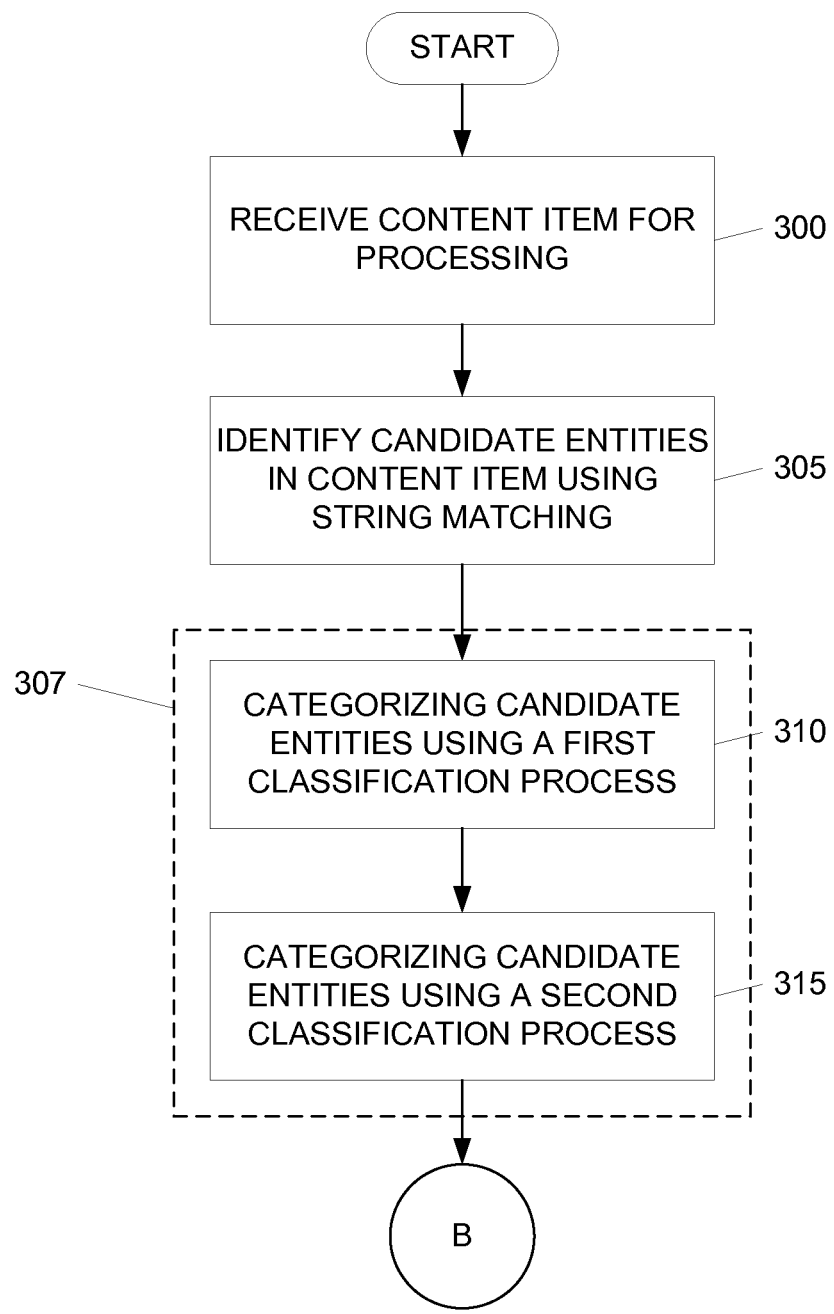
FIG. 3 illustrates an example method for identifying and classifying candidate entities in a content item according to one or more aspects described herein.

FIG. 3 illustrates an example method for identifying and classifying candidate entities. In step 300, a content item may be received. The content item may include audio, video, text and/or combinations thereof such as a web page. In step 305, candidate entities may be identified in the content item using string matching. For example, for textual content, words or phrases in the content item may be compared to the names or titles or known entities to determine if a potential match exists. In another example, audio content may be evaluated using speech recognition while video content may be analyzed for candidate entities using pattern matching techniques, speech recognition or combinations thereof. In some embodiments, a match may be defined as two words or phrases that meet a specified level of similarity. Thus, misspelled words may also be identified as a match (i.e., a candidate entity) so long as the specified amount of the word is spelled correctly. For example, if 4 out of 5 (i.e., 80%) letters in a first word matches a second word and a specified match threshold is 75%, then the first word may be considered a match with the second word.

Once candidate entities have been identified using a string matching process, the identified candidate entities may be processed using statistical tagging and analysis in step 307. The statistical tagging and analysis may include 2 classification steps 310 and 315. In step 310, a first classification process may be used to sort the identified candidate entities into groups corresponding to known entities. Candidate entities may be classified into groups if they are determined to be a potential match with the known entity corresponding to a particular group. The classification may include statistical analyses and may be based on a variety of factors including the matches determined in the candidate entity identification process of step 305, textual information surrounding the candidate entity in the content item and/or decisions made for preceding candidate entities. Textual information may be considered to be surrounding a candidate entity if the text is within a predefined distance or number of words. Alternatively, surrounding textual information may be defined by a distance in characters, words, sentences, or paragraphs and/or combinations thereof. For other types of content items such as video or audio, surrounding material may be defined by a predefined amount of time around a candidate entity. In one example, a gender of the candidate entity may be determined based on surrounding key words such as in the phrase "Bridget plays a woman" (determining that Bridget is female based on the phrase "plays a woman"). In another example, a feature for determining whether an entity corresponds to a movie title may be defined as occurring 5 or fewer words after a set X of words, where set X includes a list of words that tend to correlate to movies. Thus, the above example movie feature detector may be used to determine that entity candidate ABC in the phrase "ABC was shown in 1000 theaters nationwide," should be classified in a movie title category because "theaters" is in the set of words that tend to correlate to movies and is within 5 or fewer words of entity candidate ABC.

Other conclusions may also be drawn based on surrounding words or phrases including ages, dates of movies or songs, genre of a movie or book, marital status and the like. In another example, co-occurrences may be evaluated to determine a probability that a candidate entity refers to a known entity. Co-occurrences refer generally to the occurrence of two or more entities in the same content item. Some co-occurrences are more likely or probable than others due to various relationships between the entities or a frequency or rate at which the two entities appear together in content items. For example, a husband and wife are more likely to appear in a content item than two unrelated entities. Similarly, the director of a movie and the movie are likely to be mentioned in the same content item than the director and a movie that he or she did not direct. In one or more embodiments, a statistical classifier such as a decision tree may be used to classify candidate entities into the various categories. Decision trees and decision tree learning are described in further detail at http://en.wikipedia.org/wiki/Decision_tree_learning. The decision tree classification may further be AdaBoosted (i.e., supplemented with Adaptive Boosting). Adaptive boosting is described in further detail at http://en.wikipedia.org/wiki/AdaBoost.

Figure 4:
FIG. 4 illustrates an example of co-occurrence in a content item according to one or more aspects described herein.

FIG. 4 illustrates an example of co-occurrence in an article. Article 400 refers to a person named Bridget 403 as well as a movie 405 named "Movie 123." When attempting to tag or identify Bridget 403, the system may determine that more than one Bridget exists in a database of known entities. Accordingly, the system may evaluate the co-occurrence between Bridget 403 and "Movie 123" 405 to determine whether Bridget 403 references a first known Bridget (e.g., Bridget Smith) or a second known Bridget (e.g., Bridget Jones). Thus, if the actress Bridget Smith is known to star in the movie "Movie 123," then the Bridget referred to in article 400 is likely Bridget Smith and not Bridget Jones.

Referring again to FIG. 3, preceding decisions may also affect how a candidate entity is categorized. In one example, if a preceding reference to "Santa Claus" is identified as matching to Santa Claus, any subsequent references to "Santa" might similarly be categorized as a reference to Santa Claus, rather than, e.g., the city of Santa Ana, Calif. Such preceding decisions may be used as a factor based on the assumption that it is more likely or certain within a specified confidence that the subsequent reference to Santa corresponds to the same Santa that was previously mentioned in the same document or other content item rather than a different Santa.

Based on the first classification analysis, candidate entities may be categorized with known entities based on a probability that the candidate entity matches a specified known entity and/or type of entity (e.g., movie title, actor). According to one or more arrangements, a match probability threshold may be set so that a candidate entity might only be categorized with a known entity or type of entity if the match probability meets the specified threshold. In some instances, a candidate entity might not be categorized with any known entities or entity category due to an insufficient match probability (i.e., discarded or otherwise categorized as a false positive).

Upon completion of the first classification process, the system may perform a second classification analysis to re-sort or re-classify the candidate entities in step 315 based on the information considered in the first classification as well as new information. The second classification analysis allows the classification system to re-evaluate categorizations of candidate entities from the first classification process by analyzing not only the decisions made for preceding entity candidates, but also decisions made for following entity candidates. Such decisions might not be (and generally are not) available during the first classification process since no analysis or decisions may have been made yet for following candidate entities. Thus, having the benefit of the first classification analysis, not only may the second classification process take into account decisions made for preceding candidate entities in the first process and the second process, but also candidate entities that appear later in the content item. In some instances, the second classification analysis may re-categorize candidate entities based on the additional information available to the classification engine. Additionally or alternatively, an entity that was not initially categorized in the first classification analysis may be categorized with a known entity during the second pass based on the additional information available in the second classification process.

By way of example, consider the following passage that may be analyzed through the process of FIG. 3.

"DirectorOne has produced a brand new movie called 'Jingle Bell Rock' about aliens that invade Earth during Christmas. In the movie, the aliens decide that Christmas should not be a time of celebration and takes Santa Claus hostage."

During a first analysis, the first instance of the word "aliens" may be categorized or classified as a candidate entity for a movie title (i.e., for a movie "Aliens") based on a co-occurrence with DirectorOne who directed the movie "Aliens." The decision that the first instance of aliens should be classified as potentially matching the movie "Aliens" may be based on previous decisions such as a determination that DirectorOne corresponds to the same DirectorOne that directed "Aliens." In a second pass or analysis, however, the first instance of aliens may be discarded as a potential match with "Aliens" and as a candidate entity based on additional information. The additional information may include a decision made regarding the second instance of aliens in the passage. For example, because the second instance of aliens is preceded by the word "the" and followed by a verb, a decision may be made that the second instance of aliens is not a reference to the movie "Aliens" and is not a candidate entity. Based on the decision relating to the second instance of aliens, a classification system may determine during the second analysis that the first instance of aliens also does not correspond to a candidate entity, thereby overriding or changing the previous decision or classification that was made based on co-occurrence with DirectorOne in the first classification process.

Once candidate entities have been sorted, ambiguities may be resolved. For example, if a candidate entity is classified as being a match with more than one known entity, a disambiguation process may used to resolve which of the multiple known entities the candidate entity is associated with or a reference to. FIG. 5 illustrates an example method for disambiguating and tagging candidate entities. Disambiguation 599 may include multiple processes such as steps 500-515. In step 500, for example, a reference chain may be created for each known entity with which a candidate entity has been identified as a likely match. The reference chain(s) may be created based on the classifications and decisions made by the classification processes (e.g., classification processes of FIG. 3). Reference chains refer generally to a sequence or list of candidate entities that have been classified as being a match with the known entity. The reference chain for a known entity may be formed according to the order in which the candidate entities appear in the content item (e.g., reading order).

Figure 6A:
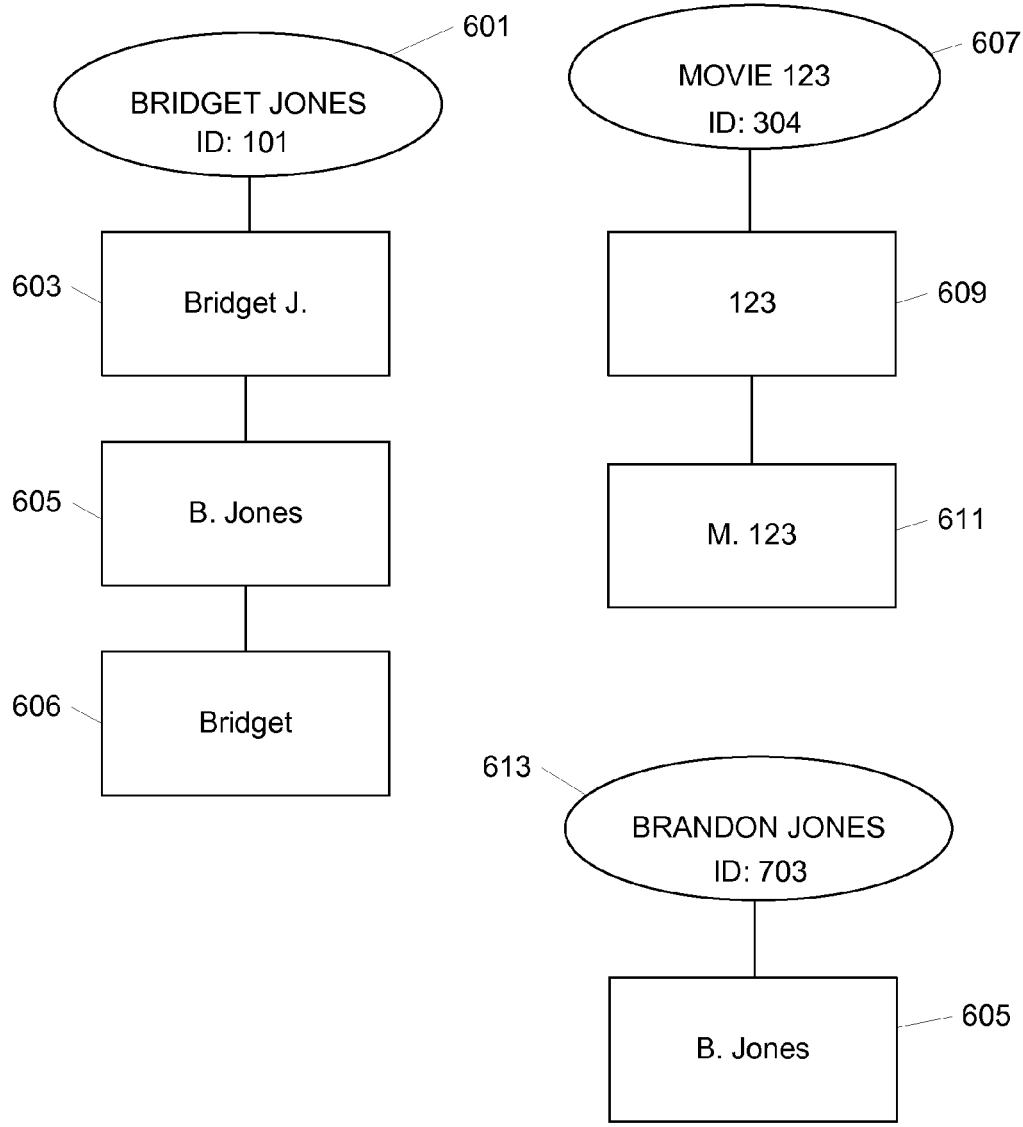
FIGS. 6A and 6B illustrate example reference chains according to one or more aspects described herein.

FIG. 6A illustrates example reference chains for article 200 of FIG. 2 created after the classification of candidate entities 205. Reference chain 601 corresponds to a known entity "Bridget Jones" having an assigned database identifier of 101. Potential matches to Bridget Jones are shown as parts of a chain connected to reference chain 601. For example, candidate entity Bridget J. 603, candidate entity B. Jones 605 and candidate entity Bridget 606 are all included in reference chain 601. In another example, reference chain 607 corresponding to known entity "Movie 123" having an assigned database identifier of 304 may include candidate entities 609 and 611. In yet another example, reference chain 613 may correspond to known entity "Brandon Jones." In the illustrated scenario, candidate entity B. Jones 605 may be a member of both chains 601 and 613. Accordingly, disambiguation of candidate entity B. Jones 605 (i.e., determining whether B. Jones 605 corresponds to Bridget Jones or Brandon Jones) may be necessary.

Referring again to FIG. 5, conflicts among reference chains may be identified in step 505. For example, reference chains may be compared with one another to determine whether common members (i.e., candidate entities) exist between the reference chains. In step 510, the conflicting reference chains may be ranked or sorted according to a level of reliability or probability based on a specified criterion. Reliability may be measured or determined based on a variety of criteria including a confidence of the matching or classification process in tagging or categorizing, respectively, a candidate entity as a potential match with each known entity, co-occurrences between the conflicted candidate entity and unconflicted entities and a length of each reference chain. The length of a reference chain may be indicative of reliability under the hypothesis that a candidate entity is more likely to match a first known entity that is mentioned more in the content item than a second known entity than the second known entity. In step 515, the lowest ranking reference chain in the sorted list may be removed as a match with the conflicted candidate entity. For example, the candidate entity may be removed from the reference chain. In step 520, the disambiguation system may determine if more than one reference chain remains in the set of conflicted reference chains for a candidate entity. If so, the process may revert to step 510.

Figure 6B:
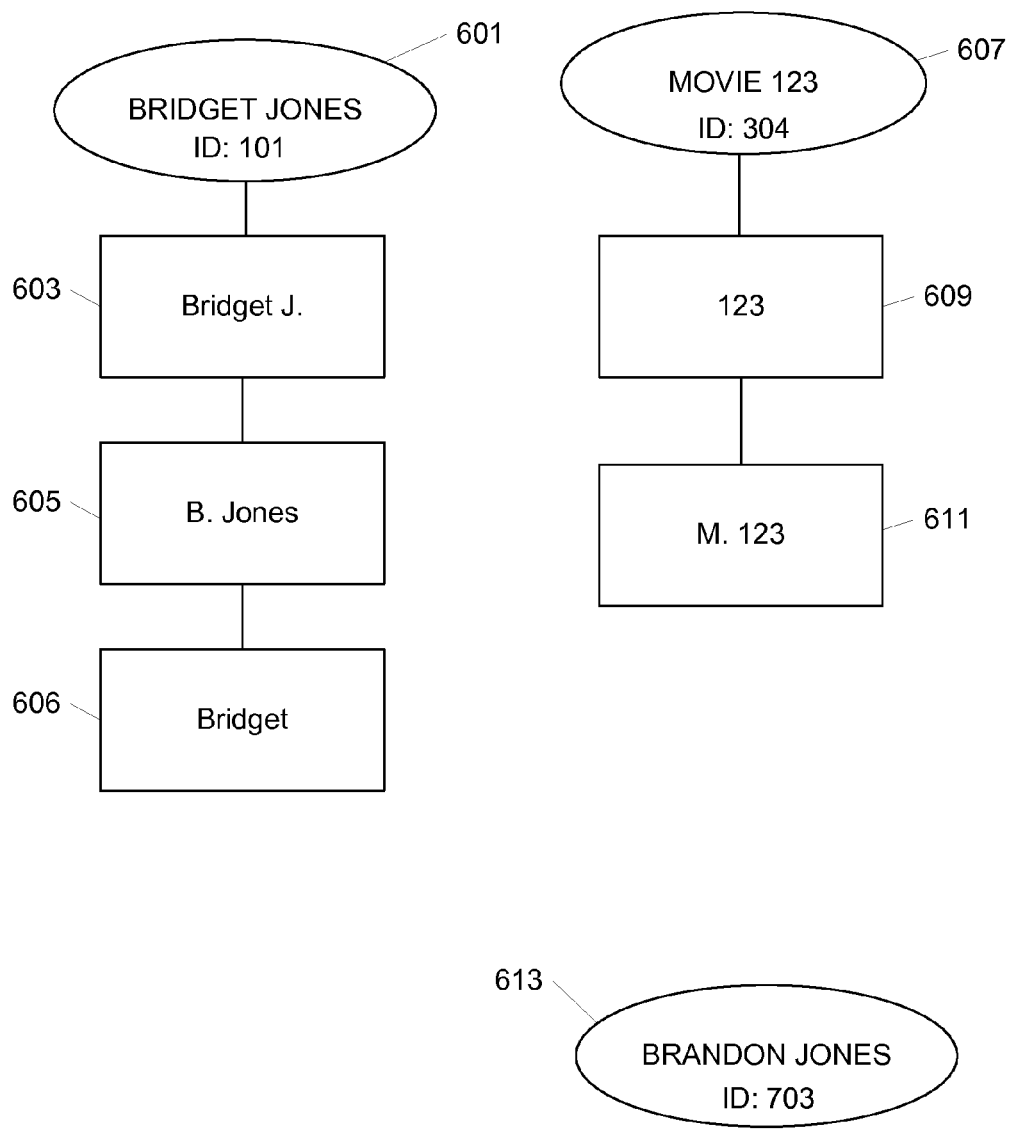

In one example of the disambiguation process, reference chains 601 and 613 of FIG. 6A may be considered conflicting reference chains because they both include candidate entity B. Jones 605. Accordingly, reference chains 601 and 613 may be ranked based on a specified criterion such as a length of the reference chains. Since reference chain 601 is longer (includes more candidate entities), chain 601 may be ranked higher than chain 613. Once ranked, the candidate entity at issue may be removed from the lowest (or lower in this instance) ranked chain 613, thereby (in this example) resolving the conflict. FIG. 6B illustrates reference chain 613 once candidate entity 605 has been removed. The conflict is resolved since candidate entity 605 (i.e., B. Jones) is now a match with only one known entity (i.e., Bridget Jones 601).

In one or more arrangements, conflicted reference chains may be initially ranked or sorted based on a first criterion of highest importance (e.g., matching/classification confidence) . Once sorted, the lowest ranking conflicted reference chain may be removed from consideration. Next, the remaining reference chains may be ranked or sorted based on a second criterion of second highest importance (e.g., co-occurrences). Again, the lowest ranking conflicted reference chain (based on the second criterion) may be removed. The process may continue until a single reference chain remains.

In one or more alternative embodiments, criteria may be used in the sorting or ranking process in an additive manner. Stated differently, the first sorting process may use only the first criterion. The second sorting process, however, may use the first criterion and the second criterion. The third sorting process may subsequently use the first criterion, the second criterion and a third criterion. Alternatively, each sorting step might only consider a single criterion.

Referring again to FIG. 5, in step 525, each rejected or discarded candidate entity (i.e. candidates entities categorized as false positives) may optionally be added to a reference chain corresponding to an entity for which the rejected candidate entity was considered a false positive. Those candidate entities categorized as false positives for entities for which no reference chain was created for the content item may be left as false positives. Such a process may be used with the hypothesis that a given expression will be used unambiguously within a given content item and thus, such discarded or rejected candidate entities may be false negatives. For example, because the content for evaluating candidate entities that appear early in a document or other content item tends to be relatively impoverished due to lack of previous information or decision making, these candidate entities might often be discarded as false positives even though they are true entity candidates. Accordingly, the process of adding such false negatives back into the processing stream allows for these candidate entities to be properly identified and tagged. In step 530, for each reference chain, a database identifier of the corresponding known entity is associated with each member candidate entity of that reference chain (i.e., each candidate entity is tagged).

As noted herein, classification, disambiguation and tagging may involve the analysis and consideration of multiple factors and attributes. For example, the spelling, capitalization and surrounding symbols, words and phrases of a candidate entity may be taken into account when evaluating potential matches to known entities. In one or more configurations, these factors and attributes may include prior knowledge or processing such as manual tagging or identification of attributes, tagged data processing and dictionary processing. Manual tagging and identification, for example, may involve human tagging of entities in content items and the creation of entity dictionaries. Entity dictionaries may include thousands of entities with each entity being identified by a canonical name, a database identifier and an entity rank (i.e., a metric allowing entities to be sorted by intrinsic likely interest or relevance). Tagged data processing, on the other hand, may be an automatic process, a manual process or a combination thereof that evaluates tagged data in content items to identify co-occurrences, frequency of co-occurrences and probabilities a word, phrase, character or entity existing relative to another word, phrase, character or entity.

According to one or more aspects, a priori (i.e., prior) knowledge may be collected and used to create or add to a statistical model such as a trigram language model configured to predict the likelihood that entities are mentioned in a content item. A tri-gram language model is a particular instance of an n-gram language model. An n-gram is a sequence of n words. To create such a language model, language is divided into a set of all possible n-grams. In one or more arrangements, a representative corpus of documents is selected and digested into the n-grams contained in these documents. For each n-gram, the language model would then count a number of occurrences found and divide by all the n-grams found. This results in the probability of that particular n-gram in the corpus and an estimate of its probability in the language generally; the more representative the corpus, the better the estimate. If a new sequence of words is identified, the new sequence of words may be divided up into n-grams in similar fashion. Each n-gram may then be looked-up in the table of probabilities composed earlier from dividing up the corpus.

These probabilities may then be multiplied together to determine the probability of the newly identified sequence. One purpose of an n-gram language model is to identify improbable sequences corresponding to names. For example, the musician known as Prince is referred to without the article "the," but ordinary princes get this article. Since seeing the word prince without a preceding article (e.g., "the") is improbable, this may be an indication that the reference is to the musician Prince and not a prince.

Dictionary processing may include a variety of processes including segregating entity names that are numbers or single common words (e.g., Predator, Clerks, Prince), determining variants of entity names (e.g., abbreviations, nicknames, acronyms, omitting or using middle names, initials or epithets), forming lists for each known entity by mapping names and/or variants with a corresponding canonical name, database identifier and/or entity rank, generating acyclic finite state automata (e.g., TRIE (retrieval) regular expressions) which will match all and only those expressions in a list and importing of external entity data. External entity data may include co-occurrence information of entities tagged by an external site such as IMDB.COM and the like. Entity names that are numbers or single common words may be segregated due to the likelihood of these entity names being false positives. By segregating such entity names, a separate statistical model may be used to evaluate whether they are false positives or true entity candidates. The separate statistical model may, in one or more instances, have a higher threshold for classification as a true entity candidate than a statistical model used for other entity names. Acyclic deterministic finite state automata may be used to more efficiently identify matches in entity names. For example, consider a database of a million names and a process of finding a match with the entity candidate "Terry." Finite state automata allows for the grouping of the one million names into finer and finer groups of a decision tree such that the entity candidate does not need to be compared to each of the one million names to find a match. Information relating to acyclic, deterministic FSAs may be found at http://en.wikipedia.org/wiki/Acyclic_deterministic_finite_automaton. The pre-processed information may be used by the matching process, the classification process and/or the disambiguation process. For example, name variants and variant lists may be used to identify candidate entities in a content item. In another example, the external entity data and language models may be used in classifying the candidate entities.

A feature detector may be used to determine various attributes of an entity or a tagged content item for matching and classification purposes. In one or more configurations, a priori data may be used to determine how the features interact and what patterns are significant. For example, if an entity is spelled in all capital letters, such an attribute may be used as a discriminating feature when evaluating potentially matching candidate entities. Thus, a candidate entity that is appears as "marvel" might not be considered a high confidence match with known entity MARVEL due to the difference in capitalization despite the same spelling. Attributes or features that are evaluated may include colons, commas, capitalization, exact matches and the like. In another example, the movie "MISSION: IMPOSSIBLE" includes a colon between the two words. Thus, if the tagging system identifies a candidate entity "MISSION IMPOSSIBLE," the tagging system might not consider the candidate entity a strong match because the candidate entity lacks a colon even though the candidate entity is spelled and capitalized in the same manner.

The following list provides an example list of feature detectors that may be used to determine attributes of an entity or content item:

ColonFeature: This feature has the value 1 if the chunk of text in question contains a colon; 0 otherwise.

CommaParentheticalFeature: Marks whether the chunk in question is contained in a comma or dash delimited parenthetical expression. For example, "The director, George Lucas, . . . ."

CommonMutualInformationFeature: Looks for words that disproportionately indicate one type—celebrity, movie, TV show—or another before or after chunk. Mutual information generally refers to the extent to which one event predicts another. Smoke and fire have high mutual information, for example. During the training stage, a process calculates the mutual information between words in a small window surrounding a chunk of known type and the type of that chunk. It then ranks these and selects those most predictive of the type. When a new chunk is considered, the mutual information within this window for each type is added up and provided as a feature value. If something is ambiguous between a TV show title and a movie title, for instance, this can provide evidence for disambiguation.

DefiniteFeature: Whether the chunk begins with 'the'. Among other things this indicates that the chunk itself is a noun phrase, or at least the beginning of one. This is weak evidence in favor of the chunk indicating a title, however, it allows the classifiers to model the properties of such titles separately.

DigitFeature: Whether the chunk contains a digit. Chunks containing digits might often be false positives.

ExactMatchFeature: Whether the chunk in question follows a tagging of the exact same sequence. Whatever evidence led the classifiers to tag the earlier chunk then weighs in favor of tagging this chunk.

FirstSentenceFeature: Has the value 1 for any chunk in the first sentence. The classifiers can use this feature to construct a separate statistical model for expressions in the first sentence, which tend to behave differently from other sentences in the document.

IdCountFeature: Assigns to its feature the ratio of the number of counts of a chunk's most common id to the number of words in the text.

InitialCapsFeature: Whether the chunk is capitalized.

InternalPunctuationFeature: Whether there are punctuation marks among the words of the chunk. This is often counter evidence against the chunk being a desirable referring expression.

ListPatternFeature: Whether this chunk appears to occur in the context of a list—e.g., "Brad Pitt, Angelina Jolie, Scarlett Johansson, Matthew Yglesias, Zbigniew Brzezinski." List contexts are problematic because they separate interior chunks from the ordinary evidence used to recognize expressions of particular types. This feature allows the classifiers to model this sort of chunk separately.

MatchByTypeFeature: Counts number of times the chunk in question was assigned different types by the first-pass classifier. The chunk itself is excluded so as not to recycle the first classification directly. This is an insoluble ambiguity detector, allowing the classifiers to give up rather than make an incorrect decision.

OuterInFeature: Whether the chunk is preceded by 'in', a preposition that often appears before titles.

OuterTheFeature: Whether the chunk is preceded by 'the'. Among other things this indicates that the chunk itself is not a complete noun phrase, as that would include the 'the'. This then is counter evidence against the chunk being a referring expression of interest.

ParenthesesFeature: Whether the chunk occurs inside parentheses. This commonly occurs with actor names in contexts such as "the uncle (Zach Braf) then . . . ."

PossessedFeature: Whether the chunk is the object of possession; for example "boat" in "John's boat". Person names seldom occur in this context.

PossessiveFeature: Whether the chunk is marked as the possessor of some other thing., e.g., "John" in "John's boat". This tends to correlate with personhood.

ProperMutualInformationFeature: Like the common mutual information feature but focuses on phrases that do not occur in a list of common English words. This would include words such as "L.A.", "Hollywood", "Academy Awards", "New York", and so on.

QuoteFeature: Whether the chunk occurs inside quotes, as is often the case with titles.

RankFeature: Assigns each type the maximum "entity rank" of any id appropriate to that type. Entity rank is a value that seeks to estimate the frame or public interest in an entity. Writers are less likely to use high rank names ambiguously.

RatioFeature: Ratio of common words to words in a chunk. If the chunk is mostly common words it is more likely to be a false positive.

SentenceXFeature: Whether it appears that the chunk in question occurs at the beginning of a sentence. This is a highly topical position; more importantly, topical entities are likely to be mentioned there.

SingleWordFeature: Whether the chunk contains a single word. This feature allows the classifiers to model such chunks separately.

SuperMatchPerTypeFeature: Counts the types of previous super matches of the chunk in question. A super match is a tagged chunk that contains the chunk in question as a substring. This feature is used to push all likely references to the same entity to a common type. This feature detector generally runs in the second pass (i.e., the second classification process).

SurroundingCapsFeature: Whether the words around the chunk have initial capitalization. This is an indication that the tagger picked a piece of a large expression—"the King" in "Return of the King", for example.

TotalPerTypeFeature: Measures the frequency of each tag type normalized by the number of tags. The type of the current chunk, if any, is ignored. This is an ambiguity detector. It can help the classifiers determine when they should give up and ignore the chunk.

TypeDistanceBackFeature: Number of words back from this chunk to other tagged chunks of particular types. This helps, for example, in determining that an expression refers to a TV show rather than a movie of this same name when the chunk appears amid other chunks tagged as TV shows.

TypeDistanceForwardFeature: Like the previous feature (i.e., TypeDistanceBackFeature) but looking in the opposite direction.

UnbalancedQuoteFeature: Whether the chunk is bracketed on only one side by a quote character. This is an indication that it is part of a larger title.

UncapitalizedFeature: Whether there is some word in the chunk that does not have initial capitalization. Again this may indicate a false tagging.

WhoFeature: Whether the chunk is followed by the word 'who', 'whom', or 'whose, all indications that it refers to a person.

WordCountFeature: Counts the words in the chunk. The classifier may choose to model chunks of different lengths differently.

XDigitFeature: Whether the chunk is followed by a digit.

Figure 7:
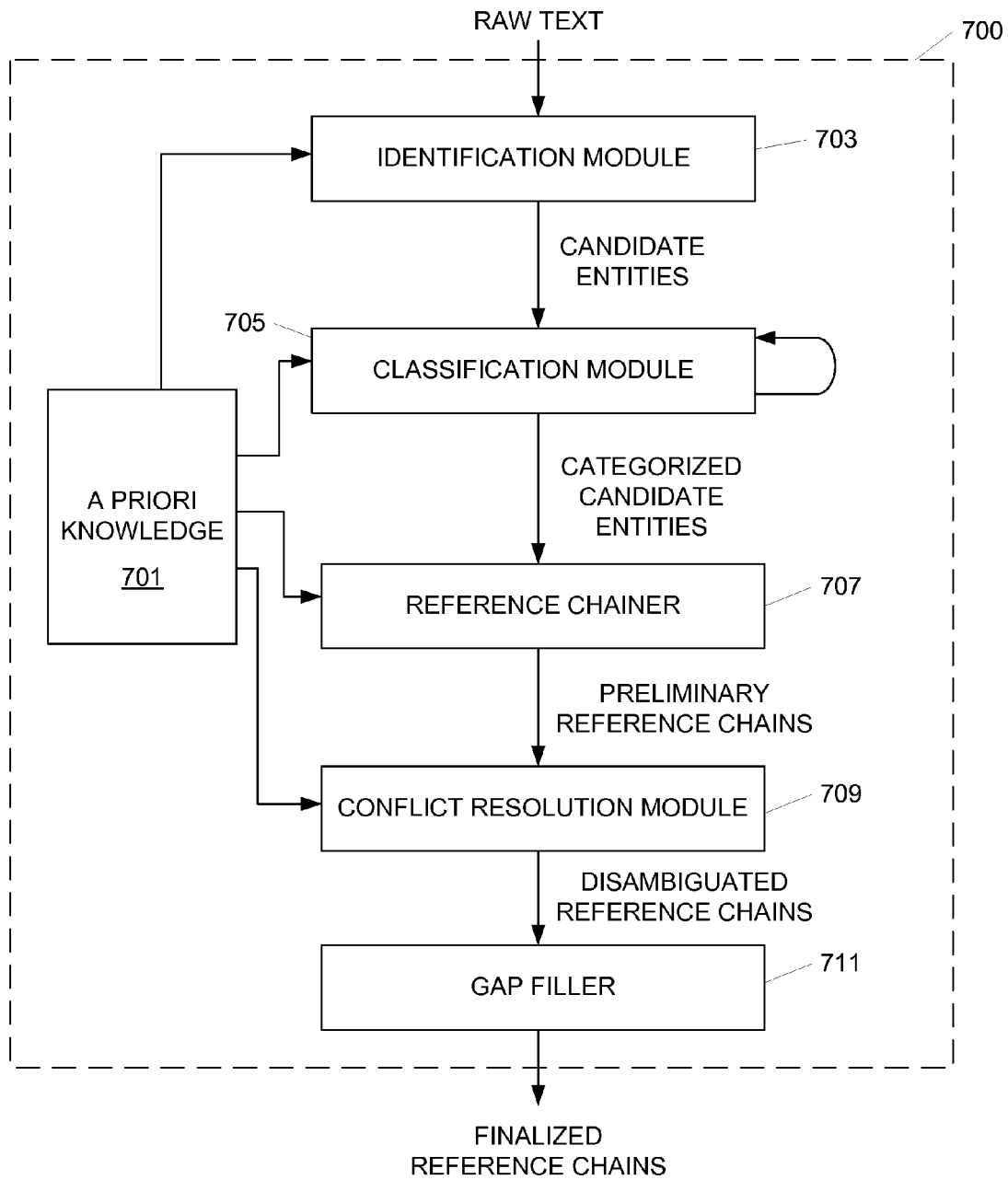
FIG. 7 illustrates an example block diagram of an apparatus for receiving content item data and generating content item recommendations according to one or more aspects described herein.

FIG. 7 illustrates a block diagram of a system configured to classify, disambiguate and tag potential entity references in a content item. Tagging system 700 may include a multiple processing modules including an identification module 703, classification module 705, reference chainer 707, conflict resolution module 709 and gap filler 711. Additionally, database 701 may be configured to store a variety of information such as application data, user preference information, a priori knowledge, entity identifiers, content items, application programming and the like. One or more of modules 703, 705, 707 and 709 may used the data stored in database 701 in various processes.

Identification module 703 may be configured to identify candidate entities in a content item using various methods including those described previously. For example, raw text may be fed into the identification module 703 so that candidate entities may be identified therefrom. The candidate entities may then be fed into a classification module 705 configured to classify the candidate entities according to likely matches with types of entities. Classification module 705 may use various classification rules and criteria including those described previously. Classification module 705 may process the candidate entities two or more times as discussed herein. The resulting categorizations may then be submitted to a reference chainer 707 configured to form reference chains based on the categorizations. Once chained, conflict resolution module 709 may resolve any conflicts between reference chains using a hierarchy of criteria. The unconflicted reference chains may then be processed by a gap filler 711 that is configured to add in any false negatives that were identified in the previous processes. The identified candidate entities in a content item may then be tagged based on the finalized reference chains.

Tagging system 700 may include one or more processors, random access memory (RAM) modules or read-only memory (ROM) modules and may comprise a single apparatus or multiple apparatuses. For example, tagging system 700 may be a distributed system that spans multiple networked or otherwise connected devices. The components and modules of system 700 may comprise hardware, software, firmware or any combinations thereof.

Figure 9:
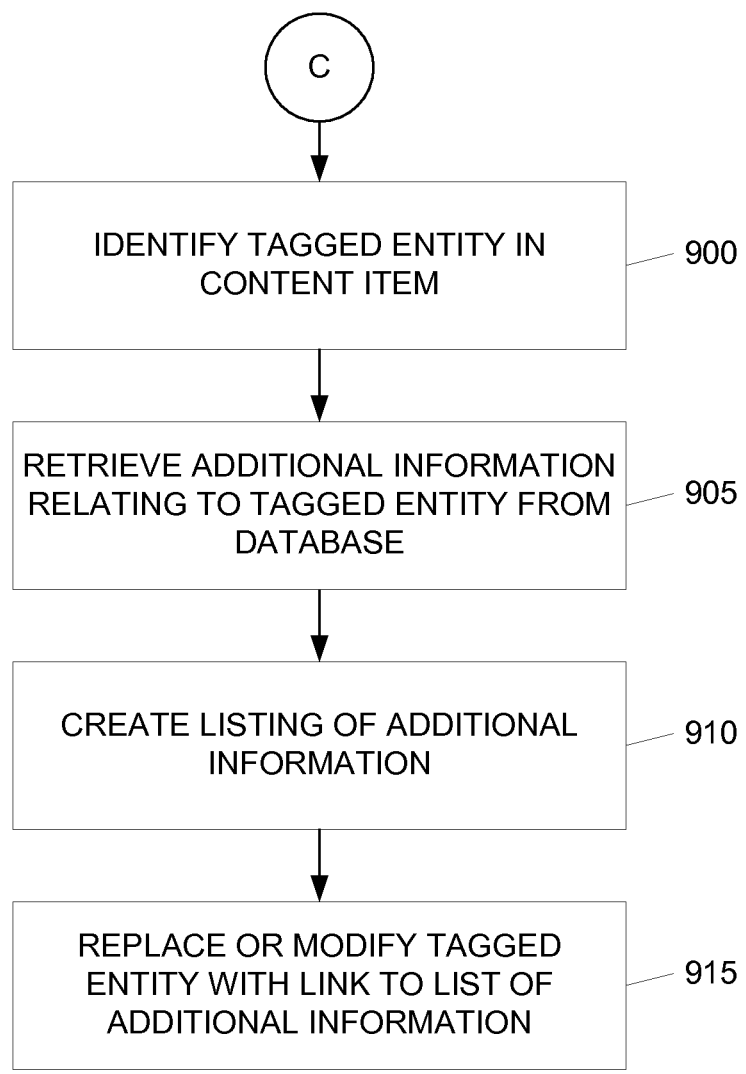
FIG. 9 illustrates a method for associating links to additional information with a tagged content item according to one or more aspects described herein.

FIG. 9 illustrates an example method by which tagged entities may be converted to links that allow a user to view other information associated with the tagged entities. In step 900, for example, a tagged entity may be identified from a tagged content item. The identification may be performed based on database identifiers associated with the tagged entities. In step 905, other information associated with the entity corresponding to the database identifier may be retrieved from a content information database. The information may include links, articles, videos, music and the like. In step 910, a listing (e.g., list 805 of FIG. 8) may be created, for example, as a webpage of the additional information associated with the entity. In step 915, the tagged entity in the content item may be replaced or modified to include a link to the additional information.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more of the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

I claim:

1. A method comprising:
identifying, at a processor, a candidate entity in a media content item, wherein the candidate entity is a potential identification of a first known entity, wherein the media content item comprises a plurality of words or phrases and wherein the candidate entity corresponds to a first word or first phrase of the plurality of words or phrases;
performing a first categorization of the candidate entity based on a first set of factors, wherein the first categorization comprises categorizing at least one other candidate entity following the candidate entity in the media content item according to a sequence in which the media content item is to be consumed by a user, wherein the at least one other candidate entity corresponds to a second word or second phrase of the plurality of words or phrases;
performing a second categorization of the candidate entity, after the first categorization, based on a second set of factors, wherein the second set of factors is different from the first set of factors and comprises, at least in part, results of the first categorization associated with the at least one other candidate entity;
determining, after the second categorization, that the candidate entity is categorized with a plurality of known entities;
in response to determining that the candidate entity is categorized with the plurality of known entities, selecting one of the plurality of known entities corresponding to the candidate entity, and
tagging the candidate entity, based on the selection of the one of the plurality of known entities and separately from tagging the at least one other candidate entity, as identifying the selected one of the plurality of known entities.

2. The method of claim 1, wherein identifying the candidate entity in the media content item is performed using string matching.

3. The method of claim 1, wherein the candidate entity includes at least one of: a person's name and a title of a content item.

4. The method of claim 1, wherein the first set of factors includes a rate of co-occurrence between the candidate entity and the at least one other candidate entity.

5. The method of claim 1, wherein tagging the candidate entity includes assigning, in the memory, a database identifier of one of the plurality of known entities to the candidate entity.

6. The method of claim 1, wherein the first set of factors includes a word that immediately follows the candidate entity in the media content item.

7. The method of claim 1, wherein the plurality of known entities includes the first known entity and a second known entity and wherein selecting one of the plurality of known entities corresponding to the candidate entity includes:
ranking the first known entity and the second known entity based on a first categorization reliability criterion;
determining that the first known entity is ranked lower than the second known entity; and
removing the first known entity as a potential identification of the candidate entity.

8. The method of claim 1, further comprising associating the tagged candidate entity with a link to additional information about the candidate entity.

9. The method of claim 1, further comprising:
discarding the at least one other candidate entity as a potential identification of the first known entity during the second categorization;
determining, after completing the first and second categorizations, that a set of one or more candidate entities in the media content item are categorized as identifying the first known entity; and
in response to determining that the set of one or more candidate entities are categorized as identifying the first known entity, adding the at least one other candidate entity to the set of one or more candidate entities categorized as identifying the first known entity.

10. The method of claim 1, wherein the plurality of words or phrases are identified from at least one of: text, an image and speech.

11. The method of claim 7, wherein the plurality of known entities includes a third known entity and wherein selecting one of the plurality of known entities corresponding to the candidate entity further includes:
ranking the third known entity and the second known entity based on a second categorization reliability criterion;
determining that the third known entity is ranked lower than the second known entity based on the second match categorization criterion; and
removing the third known entity as a potential identification of the candidate entity.

12. The method of claim 7, wherein the first categorization reliability criterion includes a number of candidate entities in the media content item categorized as potential identifications of the first known entity or the second known entity.

13. The method of claim 7, wherein the first categorization reliability criterion includes a categorization confidence.

14. The method of claim 7, wherein the first categorization reliability criterion includes a co-occurrence rate between the candidate entity and another candidate entity that is categorized with only one known entity.

15. One or more non-transitory computer readable media storing computer readable instructions that, when executed, cause an apparatus to:
identify, at the apparatus, a candidate entity in a media content item, wherein the candidate entity is a potential identification of a first known entity wherein the media content item comprises a plurality of words or phrases and wherein the candidate entity corresponds to a first word or first phrase of the plurality of words or phrases;
perform a first categorization of the candidate entity based on a first set of factors, wherein the first categorization comprises categorizing at least one other candidate entity following the candidate entity in the media content item according to a sequence in which the media content is configured to be consumed by a user, wherein the at least one other candidate entity corresponds to a second word or second phrase of the plurality of words or phrases;
perform a second categorization of the candidate entity after the first categorization based on a second set of factors, wherein the second set of factors is different from the first set of factors and comprises at least in part, results of the first categorization associated with the at least one other candidate entity;
determine, after the second categorization, that the candidate entity is categorized with a plurality of known entities;
in response to determining that the candidate entity is categorized with a plurality of known entities, select one of the plurality of known entities corresponding to the candidate entity; and
tag the candidate entity, based on the selection of the one of the plurality of known entities and separately from tagging the at least one other candidate entity, as identifying the selected one of the plurality of known entities.

16. The one or more computer readable media of claim 15, wherein the first set of factors includes a word that immediately follows the candidate entity in the content item.

17. The one or more computer readable media of claim 15, wherein the plurality of known entities includes the first known entity and a second known entity and wherein selecting one of the plurality of known entities corresponding to the candidate entity includes:
ranking the first known entity and the second known entity based on a first categorization reliability criterion;
determining that the first known entity is ranked lower than the second known entity; and
removing the first known entity as a potential match with the candidate entity.

18. A method comprising:
receiving a sequence of words or phrases occurring in a piece of video, audio, audiovisual, or textual content;
sequentially processing the sequence of words or phrases in a first categorization process, wherein the first categorization process includes categorizing each of a first word or phrase and a second word or phrase in the sequence as identifying one or more corresponding known entities, wherein the second word or phrase follows the first word or phrase in the sequence, and wherein categorizing the first word or phrase during the first categorization process is performed without using a categorization of the second word or phrase;
processing the sequence of words or phrases in a second categorization process including performing another categorization of the first word or phrase using the categorization of the second word or phrase resulting from the first categorization process;

upon determining that the first word or phrase is categorized with a plurality of known entities, selecting one of the plurality of known entities as being identified by the first word or phrase; and tagging the first word or phrase as identifying the selected one of the plurality of known entities.

19. An apparatus comprising:

a processor; and memory storing computer readable instructions that, when executed, cause the apparatus to:

identify a candidate entity in a media content item, wherein the candidate entity is a potential identification of a first known entity, wherein the media content item comprises a plurality of words or phrases and wherein the candidate entity corresponds to a first word or first phrase of the plurality of words or phrases;

perform a first categorization of the candidate entity based on a first set of factors, wherein the first categorization comprises categorizing at least one other candidate entity following the candidate entity in the media content item according to a sequence in which the media content is configured to be consumed by a user, wherein the at least one other candidate entity corresponds to a second word or second phrase of the plurality of words or phrases;

perform a second categorization of the candidate entity, after the first categorization, based on a second set of factors, wherein the second set of factors is different from the first set of factors and comprises, at least in part, results of the first categorization associated with the at least one other candidate entity;

determine, after the second categorization, that the candidate entity is categorized with a plurality of known entities;

in response to determining that the candidate entity is categorized with the plurality of known entities, select one of the plurality of known entities corresponding to the candidate entity; and tag the candidate entity, based on the selection of the one of the plurality of known entities and separately from tagging the at least one other candidate entity, as identifying the selected one of the plurality of known entities.

20. An apparatus comprising:

a processor; and memory storing computer readable instructions that, when executed, cause the apparatus to:

receive a sequence of words or phrases occurring in a piece of video, audio, audiovisual, or textual content;

sequentially process the sequence of words or phrases in a first categorization process, wherein the first categorization process includes categorizing each of a first word or phrase and a second word or phrase in the sequence as identifying one or more corresponding known entities, wherein the second word or phrase follows the first word or phrase in the sequence, and wherein categorizing the first word or phrase during the first categorization process is performed without using a categorization of the second word or phrase;

process the sequence of words or phrases in a second categorization process including performing another categorization of the first word or phrase using the categorization of the second word or phrase resulting from the first categorization process;

upon determining the first word or phrase is categorized with a plurality of known entities, select one of the plurality of known entities as being identified by the first word or phrase; and tag the first word or phrase as identifying the selected one of the plurality of known entities.

21. One or more non-transitory computer readable media storing computer readable instructions that, when executed, cause an apparatus to:

receive a sequence of words or phrases occurring in a piece of video, audio, audio visual or textual content;

sequentially process the sequence of words or phrases in a first categorization process, wherein the first categorization process includes categorizing each of a first word or phrase and a second word or phrase in the sequence as identifying one or more corresponding known entities, wherein the second word or phrase follows the first word or phrase in the sequence, and wherein categorizing the first word or phrase during the first categorization process is performed without using a categorization of the second word or phrase;

process the sequence of words or phrases in a second categorization process including performing another categorization of the first word or phrase using the categorization of the second word or phrase resulting from the first categorization process;

upon determining that the first word or phrase is categorized with a plurality of known entities, select one of the plurality of known entities as being identified by the first word or phrase; and tag the first word or phrase as identifying the selected one of the plurality of known entities.

* * * * *